(No Model.)

J. F. GILLILAND.
GEAR.

No. 249,752. Patented Nov. 22, 1881.

WITNESSES:
Chas. W. Allen.
J. E. Brown

INVENTOR:
James F. Gilliland
by Munday, Evarts & Adcock
his attys

N. PETERS, Photo-Lithographer, Washington, D. C.

UNITED STATES PATENT OFFICE.

JAMES F. GILLILAND, OF INDIANAPOLIS, INDIANA, ASSIGNOR TO THE GILLILAND ELECTRIC MANUFACTURING COMPANY, OF SAME PLACE.

GEAR.

SPECIFICATION forming part of Letters Patent No. 249,752, dated November 22, 1881.

Application filed January 3, 1881. Renewed September 19, 1881. (No model.)

*To all whom it may concern:*

Be it known that I, JAMES F. GILLILAND, of Indianapolis, in the county of Marion and State of Indiana, have invented certain new and useful Improvements in Gears, of which the following is a specification.

My invention relates to improvements in cog-gears, the object of the same being to provide a noiseless gear, which result I accomplish by means of a spiral spring mounted in a peripheral groove on the wheel, so that the coils of the spring serve as the cogs of the wheel. Such cogs, consisting, as they do, of the coils of the spiral spring, have sufficient elasticity, when meshing with the ordinary cogs of the corresponding gear, to effectually prevent all noise, however rapid be the revolution of the gears.

My invention is specially designed for use upon telephones and other apparatuses where it is desired to have noiseless gearing.

Figure 1:
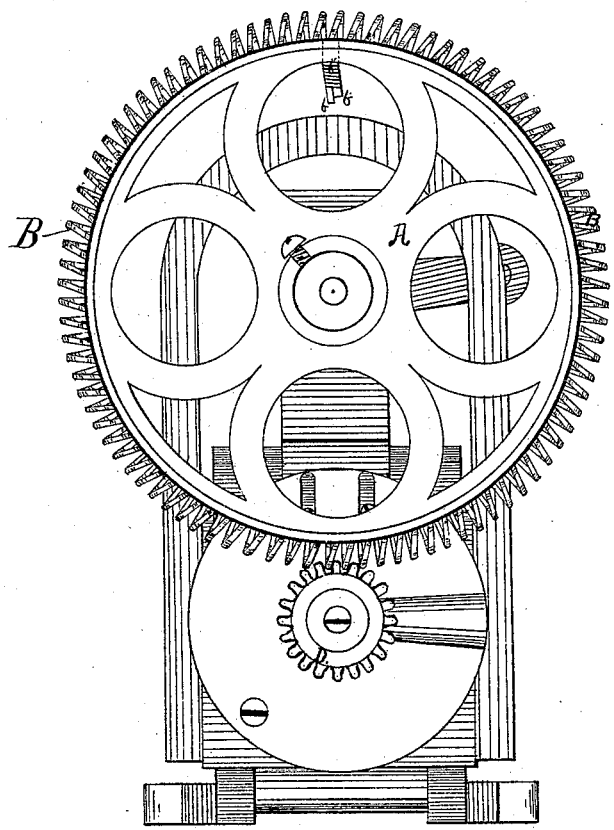
Figure 2:
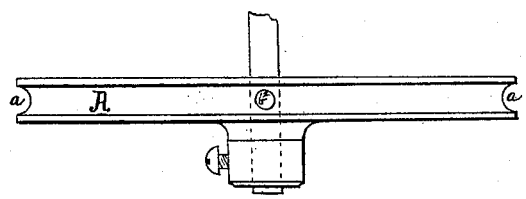

In the accompanying drawings, which form a part of this specification, and in which similar letters of reference indicate like parts, Figure 1 is a side elevation of a device embodying my invention as applied to a telephone magneto-electric generator. Fig. 2 is a top view of the wheel, the spiral spring being removed.

In said drawings, A represents the wheel, provided with a groove, $a$, on its periphery, and B is an ordinary coil-spring having its ends fastened together. The diameter of the groove $a$ is made to correspond to that of the coils of the spring, so that the latter fits snugly in said groove, the groove being of such depth that about one-third of the circumference of the coil is buried in it. The length of the spring is such, in relation to the circumference of the wheel, that the spring fits tightly as a band or tire upon the wheel. By varying the size of the wire of which the spring is made and the distance apart of the coils the same may be made to mesh properly with the cogs of corresponding gears, whatever the size of the cogs. The two ends $b\ b$ of the coil-spring are secured together by wrapping them with a small wire, $b'$, and soldering them; or they may be fixed together in any other suitable manner. $b^2$ is a small hole or opening in the periphery of the wheel, for the insertion of the ends of the coil thus secured together, so that they may be out of the way. The ends of the coil thus inserted through the opening $b^2$ serve also to keep the spring-coil in place and to prevent its slipping on the wheel.

D represents a common pinion with which my improved gear meshes. This pinion, however, may, if desired, be made in the same manner as the large wheel.

In making my improved gear the ends of the coil-spring are first secured together, forming a coil-spring band, which, being flexible and elastic, is easily slipped on the wheel into the peripheral groove, the ends of the spring being inserted in the opening in the wheel. The opening in the wheel should be in the bottom of the groove, so that the ends of the coil-spring will project toward the center of the wheel, and thus be out of the way.

The operation of my improved gear is similar to ordinary gears, excepting that it is noiseless.

I do not wish to limit myself to the particular manner shown of securing the coil-spring to the wheel, as this may be done in various ways.

My improved coil-spring teeth for gears may be applied to straight gears, bevel-gears, and other ordinary forms of gears, as well as to spur-gears, as shown in the drawings.

What I claim is—

1. The noiseless gear consisting of a coil-spring secured to the wheel, the coils of the spring forming the cogs of the gear, substantially as specified.

2. The combination of the wheel provided with a groove or seat for the coil-spring, and the coil-spring mounted in said groove, substantially as specified.

3. The wheel provided with a peripheral groove or seat, in combination with a spring surrounding the same and forming the teeth or cogs thereof, substantially as specified.

4. A gear the teeth of which consist of the coils of a coil-spring, whereby the same is rendered noiseless, substantially as specified.

JAMES F. GILLILAND.

Witnesses:
EDMUND ADCOCK,
T. E. BROWN.